United States Patent [19]

McCarty

[11] 4,363,475

[45] Dec. 14, 1982

[54] VISE-LIKE C-CLAMP FOR GRIPPING VARIOUSLY SHAPED WORK PIECES IN VARYING POSITIONS

[76] Inventor: Robert W. McCarty, 26903 Cook Rd., Olmsted Falls, Ohio 44138

[21] Appl. No.: 185,325

[22] Filed: Sep. 8, 1980

[51] Int. Cl.[3] .................... B23Q 1/04

[52] U.S. Cl. .................... 269/69; 269/96; 269/101; 269/164; 269/249; 269/283; 269/902

[58] Field of Search .................... 269/164, 69, 70, 96, 269/101, 243, 249, 279-284, 902, 143

[56] References Cited

U.S. PATENT DOCUMENTS

| | | | |
|---|---|---|---|
| 50,941 | 11/1865 | Macotter | 269/164 |
| 1,497,107 | 6/1924 | Lasell | 269/164 |
| 1,659,302 | 2/1928 | Reinhardt | 269/69 |
| 2,524,969 | 10/1950 | Fairchild | 269/279 |
| 3,596,898 | 8/1971 | Hilburn | 269/243 |
| 3,767,183 | 10/1973 | Van Gelder | 269/283 |

*Primary Examiner*—Robert C. Watson
*Attorney, Agent, or Firm*—W. Britton Moore

[57] ABSTRACT

A vise-like C-clamp with adjusting screw and wherein two elongated square bars are fixedly attached to one jaw thereof and the clamping end of the adjusting screw whereby a pair of gripping heads may be selected from a group of variously shaped heads and oppositely and interchangeably arranged on each of the bars. The clamp may be hand held or adjustably mounted in a supporting base for gripping and positioning variously shaped work pieces in horizontal, vertical, and angularly held positions while work is performed thereon.

5 Claims, 7 Drawing Figures

VISE-LIKE C-CLAMP FOR GRIPPING VARIOUSLY SHAPED WORK PIECES IN VARYING POSITIONS

BRIEF SUMMARY OF THE INVENTION

This invention relates to a vise-like C-clamp with an adjusting screw and wherein two elongated square bars are fixedly attached to one jaw thereof and the clamping end of the adjusting screw whereby two gripping heads may be selected from a group of variously shaped heads and oppositely and interchangeably arranged on each bar. The clamp may be hand held or adjustably mounted in a supporting base for gripping and positioning variously shaped work pieces, e.g., quarter round, half round, tubular, square, flat, triangular, hexagonal work pieces, and angle iron tubing and pipe in horizontal, vertical, and angularly held butt positions while work is performed on or therewith.

CROSS REFERENCE TO PRIOR ART

While various types of C-clamps have heretofore been proposed, such as those represented in U.S. Pat. No. 2,472,022, to Neal, McVey U.S. Pat. No. 2,903,929, Hilburn U.S. Pat. No. 3,596,898, and Lambert U.S. Pat. No. 3,626,497, such devices are usually intended for clamping a particular type and shape of work piece and are not equipped with interchangeable gripping means for clamping variously shaped and contoured work pieces in varying positions.

SUMMARY OF THE INVENTION

The principal object of the present invention is to provide a vise-like C-clamp with an adjusting screw and wherein two elongated square bars are fixedly attached to one jaw thereof and to the clamping end of the adjusting screw and adapted to have oppositely and removably sleeved on each bar a pair of gripping heads selected from a group of variously shaped heads for gripping and supporting varyingly shaped and contoured work pieces in varying positions.

Another object is the provision of a vise-like C-clamp adaptable for hand holding varyingly shaped and contoured work pieces, or which may be adjustably mounted in a base for supporting the gripped work pieces in varying fixed positions.

Still another object is to provide a vise-like C-clamp which may be fixedly mounted in an upright position within a base arranged on a supporting surface with the jaws thereof upstanding and which may be adjusted to angular and horizontal positions to correspondingly position the clamped work pieces to facilitate work being performed thereon.

A further object is the provision of a vise-like C-clamp wherein elongated transversely extending square bars are affixed to one jaw and the clamping end of the adjusting screw thereof and selectively and interchangeably sleevably receive pairs of gripping heads selected from a group of variously shaped heads contoured corresponding to and functioning to interfit with and grip work pieces in varying work performing positions.

A still further object is to provide a vise-like C-clamp wherein the gripping heads are arranged in three pairs respectively contoured so as to interfit and correspond with quarter round, half round, tubular, square, flat, triangular, hexagonal work pieces, and angle iron tubing and pipe in horizontal, angular, and vertically held work performing positions.

These and other objects and advantages will be apparent as the specification is considered with the accompanying drawings, wherein.

DETAILED DESCRIPTION

Figure 1:
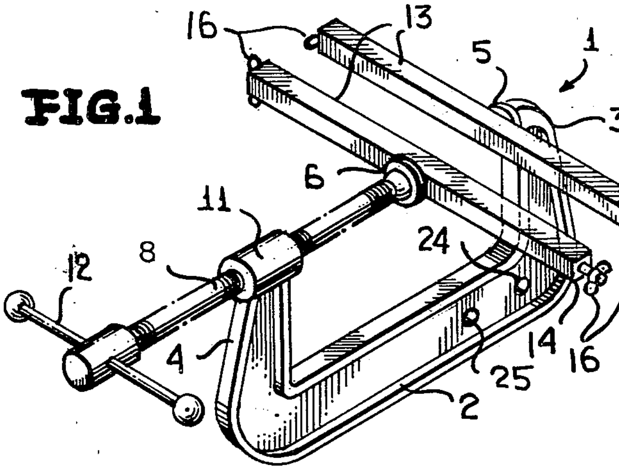
FIG. 1 is a perspective view of a C-clamp removed from its supporting base and adapted for hand use, with the square rods for supporting the gripping heads spaced apart to receive pairs of heads thereon.

Referring more particularly to the drawings, wherein similar reference characters designate like parts throughout the several views, numeral 1 identifies the particular C-clamp herein shown for the purpose of illustrating the invention, including the usual unitary C-frame 1 having a shank 2 formed with laterally extending arms 3 and 4 at its opposing ends, and wherein arm 3 is provided with a flattened jaw 5. A second clamping member or jaw 6 has a flattened head 7 in swivel engagement with a rod 8. This rod 8 is externally threaded, as at 10, to engage internal threads, not shown, on the inside of an elongated boss 11 formed on the terminus of the other C-frame arm 4.

The rod 8 is circular in cross section and its upper end is transversely bored to receive a handle member 12 either slidably or fixedly positioned therein and rotatable, in the usual manner, to move the clamping member head 7 relative to jaw 5, as will hereinafter be apparent.

Figure 5:
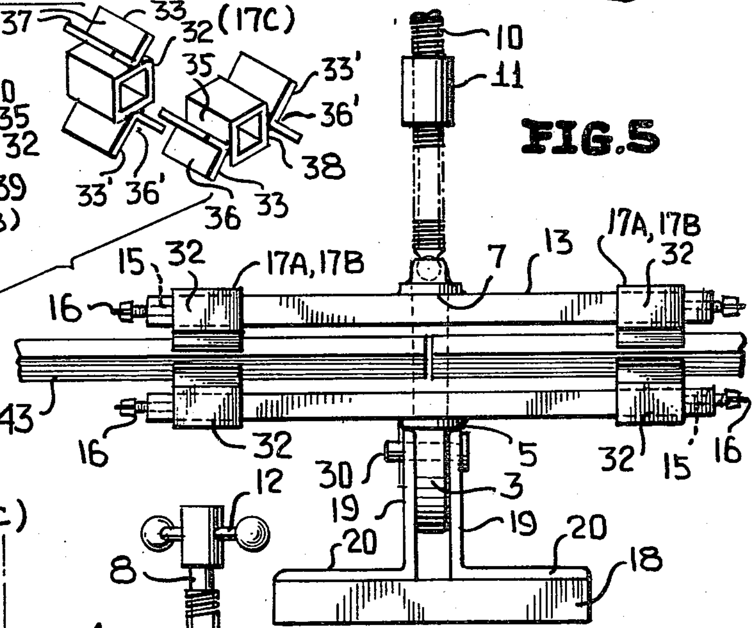
FIG. 5 is a front elevation of the assembled C-clamp in the FIG. 4 full line position, showing the general positioning of the pairs of gripping heads on the rods and their coaction with the clamped work piece.

Suitably affixed, such as by welding, to the flattened jaw 5 and head 7 and extending transversely relative thereto, as best shown in FIGS. 1 and 5, are two square shaped bars 13, which may be 9/16"×8" in length, although the particular size and length obviously is optional. Each bar 13 is fixedly attached generally midway of a flattened surface thereof, and the opposing ends 14 are drilled or tapped, as at 15, to receive threaded thumb screws or the like 16 which function to retain pairs of gripping heads 17A, B and C therein, as presently to be described. The two bars 13 are arranged parallel to and in aligned relation to each other.

Figure 2:
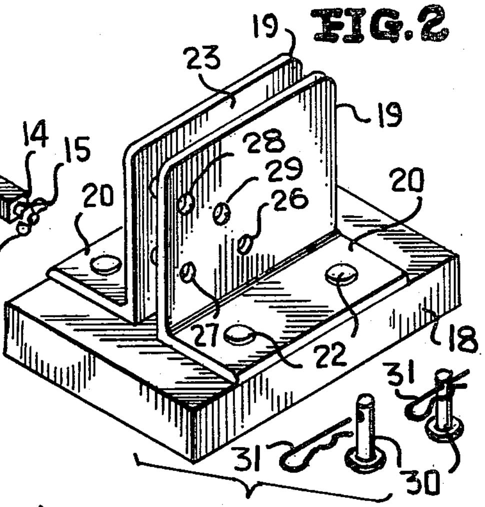
FIG. 2 is a perspective view of a base for adjustably supporting the C-clamp.
Figure 3:
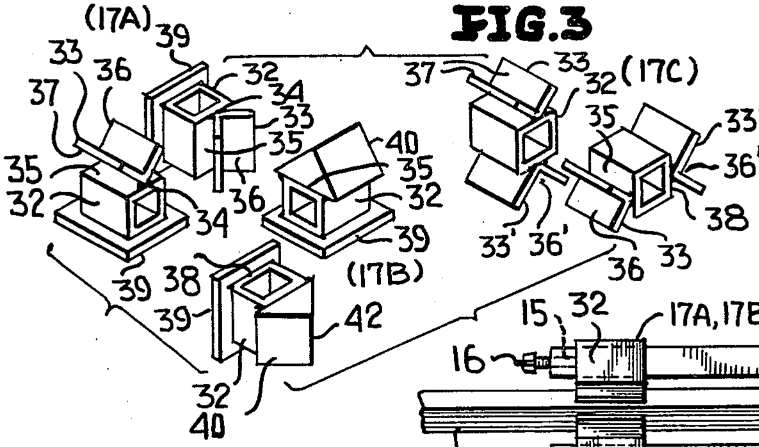
FIG. 3 is a perspective view of a group of three types of gripping heads.
Figure 4:
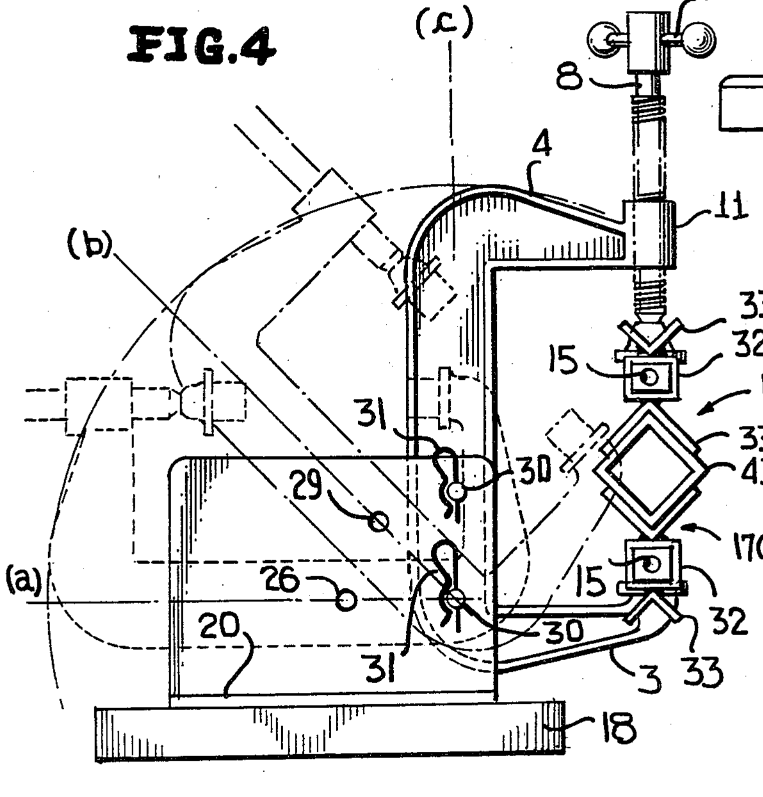
FIG. 4 is a side elevation of an assembled C-clamp and base, showing in full lines the C-clamp in vertical position with pairs of heads thereon interfitting with and clamping square tubing therebetween, and wherein the angular and horizontal positions of the C-clamp are shown in dotted lines.

While the C-clamp shown in FIG. 1 may be held in one hand when a work piece is clamped therein so that the other hand may be used to perform work thereon, the C-clamp may be more efficiently and securely held in position when fixedly supported by a base 18, which, of course, frees both hands for the work performing operations. Such a base 18 includes a pair of upstanding L-shaped plates 19 with their oppositely and laterally bent base flanges 20 flatly mounted on and suitably affixed to a flat supporting member 21, as at 22. The plates 19 are flat and spaced apart in parallel relation to provide a channel 23 to receive the shank 2 of the C-clamp so that the arms 3–4 thereof project upwardly, as best shown in FIG. 4. A pair of spaced apertures 24–25, formed in shank 2 adjacent arm 3, are selectively alignable with two of four spaced apertures 26, 27, 28 and 29 provided in plates 19 at one end thereof, depending on the desired position or angle to be assumed by the C-clamp therein. As best shown in FIGS. 2 and 4, apertures 26–29 are arranged in a generally square, but slightly offset pattern, so that when apertures 24–25 are aligned with apertures 26–27, for example, suitable locking pins 30 may be inserted therethrough and retained therein by suitable retaining wires 31 insertable through the apertured ends of the pins 30. When so supported, the C-clamp will be fixedly supported in the dotted line horizontal position (a) of FIG. 4. When the dotted line angular position (b) is desired, pin 30 is removed from apertures 27 and 25 and the C-clamp is pivoted or tilted upwardly, whereupon pin 30 is reinserted through aligned apertures 28 and 25. If the full line vertical position (c) is required, pin 30 is withdrawn from apertures 28–25 and the C-clamp further pivoted until the apertures 29 and 24 are aligned, and the pin 30 reinserted therethrough. From the foregoing, it will be evident that pin 30 may remain in position within apertures 26–24 so as to function as a pivot during the selective adjustment of the C-clamp through the three positions (a)–(c).

Referring to FIGS. 3,4,6 and 7, three pairs of gripping heads 17A, 17B and 17C are interchangeably utilized, with each pair being similarly shaped and mounted on the same rod, but with the clamping or gripping face portions of the heads in each pair differing in contour and shape from those of the opposing pairs. Each of the gripping heads in the pairs 17A, 17B and 17C is similarly constructed of 9/16" I.D. square tubing 32 so as to be sleevable over the 9/16" square bars 10, although, as with the latter, the tubing size is optional.

First considering the heads 17A, an angle iron member 33, corresponding in length with tubing 32, is suitably affixed at its apex 34 by welding or the like to a flat face 35 of the tubing so that a generally shallow V-shaped gripping cavity 36 is formed by the diverging sides 37 of the angle iron. Suitably affixed to an opposing flat face 38 of the tubing by welding or the like is a flat base member 39, slightly larger in dimensions than tubing 15.

Next referring to the heads 17B, such include the square tubing 32 and flat base member 39 attached to flat face 38 thereof. However, in lieu of the angle iron member 33 of pair 17A, a solid triangular gripping member 40 is suitably affixed by welding or the like at its flat base face 41 to flat face 35 of tubing 32 so that the pointed apex 42 thereof extends outwardly therefrom.

The heads 17C to some extent resemble those of pair 17A in that oppositely diverging angle iron members 33 and 33$^1$ are affixed to the flat faces 35–38 of the tubing 32 and provide oppositely extending generally V-shaped gripping cavities 36–36$^1$. The legs of the angle iron members 36$^1$ of each head may be increased in length, as in FIG. 4, to provide a deeper cavity 36$^1$ than the shallower cavity 36 with increased holding and clamping capacity.

Figure 6:
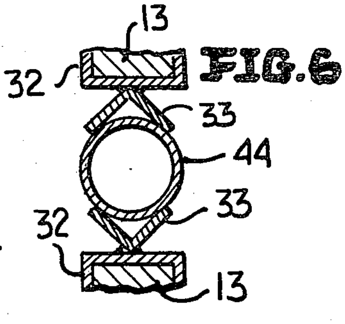
FIG. 6 is a cross section through a pair of gripping heads clamping a tubular work piece or pipe therebetween.
Figure 7:
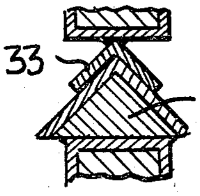
FIG. 7 is a cross section through one gripping head of a type for clamping a triangular or hexagonal work piece, with the latter only partially shown.

When the particular type of workpiece to be gripped in the C-clamp has been determined, thumb screws 16 are removed from the ends of each bar 13 and the centermost square tubing portions 32 of a pair of gripping heads 17 adaptable to coact with the opposing faces of the work piece, i.e., a square-shaped tubing 43 of FIG. 4, a tubular pipe 44 of FIG. 6, or the triangular-shaped piece 45 of FIG. 7, or other shapes not shown, e.g., quarter round, half round, flat, hexagonal, and angle iron tubing and pipe, not shown, is sleeved longitudinally on each square bar 13. The gripping heads are positioned adjacent the opposing ends of each bar so as to be appropriately equally spaced from the centrally disposed jaw portions of the C-clamp, with opposing heads being aligned with each other, as best shown in FIG. 5. Reinsertion of the thumb screws 15 prevents the heads from being displaced from the two rods. Thus, if a piece of square tubing 43 is to be clamped, as in FIG. 4, two gripping heads 17C may be sleeved on each of the bars 13 so that the deeper V-shaped gripping cavities 36$^1$ of the angle iron portions 33$^1$ thereof are adapted to oppositely snugly receive and interfit the opposing corners of tubing 43. Upon tightening of handle member 9, the uppermost bar 13 is moved toward the lowermost and fixed bar 13 so that the work piece is securely gripped and clamped between the gripping heads in position for drilling, sweating, brazing, welding, or any other desired work performing operations.

From the foregoing, it will be apparent that the gripping heads 17A–17C are arranged in pairs on the bars 13 according to the contour or shape of the particular work piece to be clamped thereby. While each head of a pair sleeved on one of the rods 13 correspond in shape and positioning, such as those of 17A, 17B and 17C, and the present corresponding gripping surfaces facing the work piece, it will be evident that the pairs of heads are interchangeable and reversible. For example, viewing FIG. 4, it will be noted that the pairs of heads 17C are arranged on the two bars 13 with their deeper angle iron cavities 36$^1$ opposing each other in clamping engagement with the square-shaped tubing work piece 43. However, if a smaller size similar work piece is to be clamped, better and more efficient clamping may be afforded by reversing the pairs of heads 17C so that their shallower V-shaped cavities 36 are in opposing relation. By the same token, if quarter or half round pieces are to be clamped, a pair of gripping heads 17A may be arranged on one of the bars 13 with their V-shaped cavities 36 facing the rounded side of the work piece, and a similar pair of heads 17A may be reversibly arranged on the other bar 13 so that their flat base members 39 confront the flattened side of the work piece. When a piece of angle iron is desired to be clamped, a pair of gripping heads 17B may be positioned on one of the bars 13 with the solid triangular gripping members 40 thereof opposing the angular recess in the angle iron, and a pair of gripping heads from either 17A or 17C may be arranged on the other bar 13. Thus, the triangular members 40 will interfit the angle iron recess and the angle iron members 33–33$^1$ will accommodate the angled other face of the angle iron, in an obvious manner. Other variations or combinations of the gripping heads 17A–17C may be readily selected to adapt the same to the work pieces being clamped, in an obvious manner which should be apparent without further detailed description.

It will be apparent that the dimensions of the gripping heads 17A, 17B and 17C may vary so that they may be adaptable to varying dimensioned work pieces and, therefore, afford more secure clamping. In addition, it is to be understood that where flat surfaces are to be clamped, it may be desirable to omit the heads so that the flat surfaced work pieces may be interengaged by and clamped between the square shaped bars 13, in an obvious manner.

While a preferred embodiment of the vise-like C-clamp has been shown and described, it is to be understood that various changes and improvements may be made therein without departing from the scope and spirit of the appended claims.

What I claim:

1. A vise-like C-clamp for gripping variously regularly and irregularly shaped elongated work pieces therein comprising a shank with laterally extending arms at the opposing ends thereof, one of said arms having a fixed flattened clamping jaw, and the other of said arms formed with boss means supporting adjusting screw means therein, said screw means having clamping head means on an inner end thereof opposing said fixed clamping jaw, a pair of elongated generally square-shaped bar means extending transversely of and fixedly secured to said clamping head means and said jaw, said bar means being generally parallel and in alinement with each other, a pair of generally square-shaped tubular gripping head means spacedly sleevably and removably arranged on each of said bar means and each formed with clamping surfaces for interfitting and coacting with contoured work pieces to be clamped therein and therebetween whereby adjustment of said screw means moves said bar means and said gripping means thereon relative to the other of said bar means on said fixed clamping jaw to effect clamping of a work piece therebetween, at least one pair of said gripping head means formed with generally V-shaped clamping cavities and flat clamping surfaces on opposing sides of the square tubing means thereof, retaining means arranged on the ends of said bar means for preventing displacement of said gripping head means, and flat base means for supporting said C-clamp including spaced apart flat parallel plate means having bent flat base flanges secureable to said flat base surface whereby said plate means is upstanding therefrom, said shank being insertable between said plate means, and said shank and plate means being apertured to receive locking pin means therethrough to selectively retain and support said C-clamp in generally horizontal, angled, and vertical positions.

2. In a device according to claim 1, wherein at least one pair of said gripping head means is formed with generally triangularly-shaped clamping portions on one side of said square tubing means and flat clamping surfaces on opposing sides thereof.

3. In a device according to claim 1, wherein at least one pair of said gripping head means is formed with generally V-shaped clamping cavities on opposing sides of the square tubing means thereof.

4. In a device according to claim 1, wherein said pairs of gripping head means are interchangeably, selectively, and removably oppositely sleevably arranged on said bar means for gripping and clamping contoured work pieces therebetween, with said gripping heads being arranged in three differently formed pairs, with one pair including V-shaped clamping cavities and flat clamping surfaces on opposing sides of the tubing means thereof, a second pair including generally triangular-shaped clamping portions on one side of said tubing means, and a third pair including V-shaped clamping cavities on opposing sides of said tubing means, with the pairs to be sleeved on said bars being selected from said three pairs and arranged in opposing relation according to the particular contoured work piece to be clamped therebetween.

5. In a device according to claim 1, wherein said C-clamp is removably and adjustably supported between spaced apart flat parallel base plates mounted on and upstanding from flat base supporting surface means, said C-clamp being adjustable to horizontal, angled, and vertical positions in said base plates.

* * * * *